US009651670B2

(12) United States Patent
Kim et al.

(10) Patent No.: US 9,651,670 B2
(45) Date of Patent: May 16, 2017

(54) METHOD AND APPARATUS FOR ADJUSTING THRESHOLD WEIGHT OF FREQUENCY DOMAIN TO IMPROVE ANTI-JAMMING PERFORMANCE AND ELIMINATE JAMMING IN GPS SYSTEM

(75) Inventors: Jun O Kim, Daejeon (KR); Jun Seoung Bae, Gyeonggi-Do (KR); Ki Won Song, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 1323 days.

(21) Appl. No.: 13/576,818

(22) PCT Filed: Nov. 4, 2010

(86) PCT No.: PCT/KR2010/007749
§ 371 (c)(1),
(2), (4) Date: Aug. 2, 2012

(87) PCT Pub. No.: WO2011/102592
PCT Pub. Date: Aug. 25, 2011

(65) Prior Publication Data
US 2012/0306695 A1     Dec. 6, 2012

(30) Foreign Application Priority Data

Feb. 18, 2010 (KR) .................. 10-2010-0014870

(51) Int. Cl.
*G01S 19/21* (2010.01)
*G01S 19/01* (2010.01)
(Continued)

(52) U.S. Cl.
CPC ............ *G01S 19/21* (2013.01); *G01S 19/015* (2013.01); *H04K 3/228* (2013.01); *H04B 1/7102* (2013.01); *H04K 3/90* (2013.01)

(58) Field of Classification Search
CPC ....... G01S 19/21; G01S 19/015; H04K 3/228; H04K 3/90; H04B 1/7102
(Continued)

(56) References Cited

U.S. PATENT DOCUMENTS

| 5,410,750 A | 4/1995 | Cantwell et al. |
| 6,842,498 B2 * | 1/2005 | Heinzl .................... G01S 19/21 375/350 |

(Continued)

FOREIGN PATENT DOCUMENTS

| JP | 2000-249754 A | 9/2000 |
| WO | WO0177705 A2 | 10/2001 |
| WO | WO 2004/021030 A1 | 3/2004 |

OTHER PUBLICATIONS

International Search Report dated Jul. 12, 2011 issued in PCT/KR2010/007749.
(Continued)

*Primary Examiner* — Chuong P Nguyen
(74) *Attorney, Agent, or Firm* — Scully Scott Murphy and Presser

(57) ABSTRACT

A method and apparatus for improving anti-jamming performance are provided. A threshold value level estimated in a GPS (global positioning system) receiver RF/IF stage, a threshold value weight, a median value of a median value of a 2~8 MHz bandwidth is estimated as a threshold value with respect to a frequency component exceeding the estimated threshold value level, and an adjustable K-median threshold scheme is provided in a multi-jamming environment.

6 Claims, 7 Drawing Sheets

(51) Int. Cl.
*H04K 3/00* (2006.01)
*H04B 1/71* (2011.01)

(58) Field of Classification Search
USPC .................................... 342/357.59; 701/474
See application file for complete search history.

(56) References Cited

U.S. PATENT DOCUMENTS

| | | | |
|---|---|---|---|
| 6,861,983 B2 | 3/2005 | Casabona et al. | |
| 7,436,356 B2* | 10/2008 | Bochkovskiy | G01S 19/21 342/107 |
| 7,660,374 B2* | 2/2010 | Casabona | G01S 19/21 375/144 |
| 8,253,624 B2* | 8/2012 | King | G01S 19/21 342/357.59 |
| 8,559,555 B2* | 10/2013 | Yule | G01S 19/21 375/147 |
| 2003/0201934 A1 | 10/2003 | Asher et al. | |
| 2008/0122674 A1* | 5/2008 | Tan | G01S 19/37 341/155 |
| 2009/0104869 A1* | 4/2009 | Li | G01S 19/21 455/1 |
| 2014/0070989 A1* | 3/2014 | Wang | G01S 19/21 342/357.59 |

OTHER PUBLICATIONS

European Search Report dated Jun. 1, 2015 issued in European Appln. No. 10846230.0.

* cited by examiner

METHOD AND APPARATUS FOR ADJUSTING THRESHOLD WEIGHT OF FREQUENCY DOMAIN TO IMPROVE ANTI-JAMMING PERFORMANCE AND ELIMINATE JAMMING IN GPS SYSTEM

TECHNICAL FIELD

The present invention relates to an anti-jamming technique in a global positioning system (GPS).

BACKGROUND ART

GPS is a satellite navigation system designed to allow five or more satellite to be viewable all the time anywhere on the earth by disposing a total of 28 satellites on six orbits at 20,000 kilometers in midair from the ground. The GPS is divided into a satellite part, a control part, and a user part, and a GPS receiver, a user part, provides information regarding a quite accurate location, velocity, time, and the like by using a plurality of satellite signals. The advancement in a digital chip fabrication technique has significantly cut down the cost of the GPS receiver, an as a selective availability (SA), an intentional error component, was released in 2000, a location accuracy of 10 meters or less can be provided, making the relevant markets in the sectors of car navigation/geodetic survey, and the like, explosively grow.

However, a satellite signal reception structure of the GPS receiver has been open and, because a satellite signal is transmitted at a long distance of 20,000 kilometers, the GPS receiver is a communication terminal having a very weak reception signal. The amplitude of a satellite signal reaching the GPS receiver is about −160 dBW ($1\times10^{-16}$ Watt), while that of a mobile communication signal reaching a mobile phone is −60 dBW ($1\times10^{-6}$ Watt). Namely, the size of the GPS signal is weaker by about 10 billions than that of the mobile communication signal.

Electronic wave jamming refers to an obstacle generated in receiving radio waves due to other radio waves, or the like, and as the amplitude of a received signal is small, it is more affected by the electronic wave jamming. Thus, a GPS using a weak satellite signal is very weak to the electronic wave jamming. Namely, the GPS is vulnerable to an unintentional radiowave interference that may be generated in the RF application field such as broadcast, communication, electricity, and the like, or a jamming signal generating an intentional noise radiowave signal to a GPS signal frequency. For example, there was a situation in which all the GPS users including medical service call systems located within a radius 15 kilometers were unable to perform communication due to radiowave interference in January 2007, San Diego, the United States. Also, a 24 Watt GPS jammer manufactured by Russia was announced that it interfere with a normal operation of a GPS user within a radius 400 kilometers.

Thus, in order to overcome such shortcomings, some countries, lead by advanced countries, continue to develop relevant techniques, and typically, one of them is a narrowband anti-jamming signal processing technique in a frequency domain for a GPS/GLONASS/Galileo receiver.

In the related art for preventing electronic wave jamming, in relation to a time domain, in general, an adaptive notch filter having a finite impulse response (FIR) structure has been commonly utilized, and in relation to a frequency domain, an N-sigma scheme has been applied in determining a threshold value as a reference for determining a jamming signal over an input signal. In this case, the N-sigma scheme has a problem in that a complicated mathematical calculation process is additionally required in order to fraction statistical processing logic such as an average, variance, standard deviation, and the like, with respect to digital sample data of GPS and a jamming signal, and statistical results, and convert the amplitude regarding FFT results into a log scale.

Also, according to the existing method, if a fixed threshold value is set to cancel interference, it would not be easy to cancel an interference signal having an amplitude smaller than the threshold value, and changing of the set threshold value accompanies a complicated calculation procedure and a requirement of additionally improved hardware.

In addition, in case in which multi-jamming or several types of jamming sources exist, it is difficult to set a threshold value for effectively canceling all the interference signals.

FIG. 1 is a graph showing a situation in which an interference signal (contaminated bin) is canceled by applying a fixed threshold value according to the related art in a single-tone situation.

As shown in FIG. 1, although the threshold value is fixed, because an interference signal exceeds the threshold value, the interference signal can be canceled.

FIG. 2 is a graph showing a situation in which when a threshold value is set according to the related art in a multi-jamming environment including multi-tone, AM, FM, sweep, pulse, and the like, because an optimum threshold value is not set, a contaminated frequency component remains.

As shown in FIG. 2, because the threshold value for canceling an interference signal is fixed, although signals have passed through a jamming signal cancel, an interference signal having an amplitude smaller than the other two interference signals are not canceled.

Thus, a method and apparatus for effectively canceling an interference signal in such a situation as in FIG. 2 without performing a complicated calculate procedure and improving hardware are required.

DISCLOSURE OF INVENTION

Technical Problem

Therefore, in order to address the above matters, the various features described herein have been conceived.

An object of the present invention is to provide a method and apparatus capable of reducing a communication interference according to jamming by applying a threshold decision algorithm by applying an anti-jamming algorithm that can be realized in a frequency domain.

Another object of the present invention is to provide a method and apparatus for setting an optimum adjustable threshold value when two or more complicated jamming sources exist or when a relatively high jamming signal is applied.

Still another object of the present invention is to provide a method and apparatus for improving a JSR (jamming to signal ratio) without improving hardware.

Solution to Problem

To achieve the above objects, there is provided a method and apparatus for reducing a communication interference according to jamming by applying a threshold decision algorithm by applying an anti-jamming algorithm that can be realized in a frequency domain.

The method may include: determining whether or not there is a jamming signal; determining an estimated threshold value for anti-jamming filter; selecting a median value in a frequency domain of the jamming signal; and determining a conclusive threshold value by using the median value and the estimated threshold value.

The apparatus may include: a reception antenna for receiving a signal; an RF/IF converter for converting the signal received from the reception antenna; and a jamming canceler of a K-median threshold value adjustment scheme for processing a signal by using the converted signal.

Advantageous Effects of Invention

According to exemplary embodiments of the present invention, a jamming influence can be reduced by applying a new threshold value decision algorithm, not an existing scheme, by applying an anti-jamming algorithm that can be realized in a frequency domain.

In addition, when two or more complicated jamming resources exist or when a relatively high jamming signal is applied, an adjustable threshold value available for setting an optimum threshold setting can be set.

In addition, an improvement of JSR (jamming to signal ratio) of 5 dB to 10 dB can be obtained without improving hardware performance.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 7 is a graph showing an effect of canceling interference when an adjustable K threshold value method according to an exemplary embedment of the present invention is applied in a multi-jamming environment including multi-tone, AM, FM, sweep, pulse, and the like;

BEST MODE FOR CARRYING OUT THE INVENTION

Figure 1:
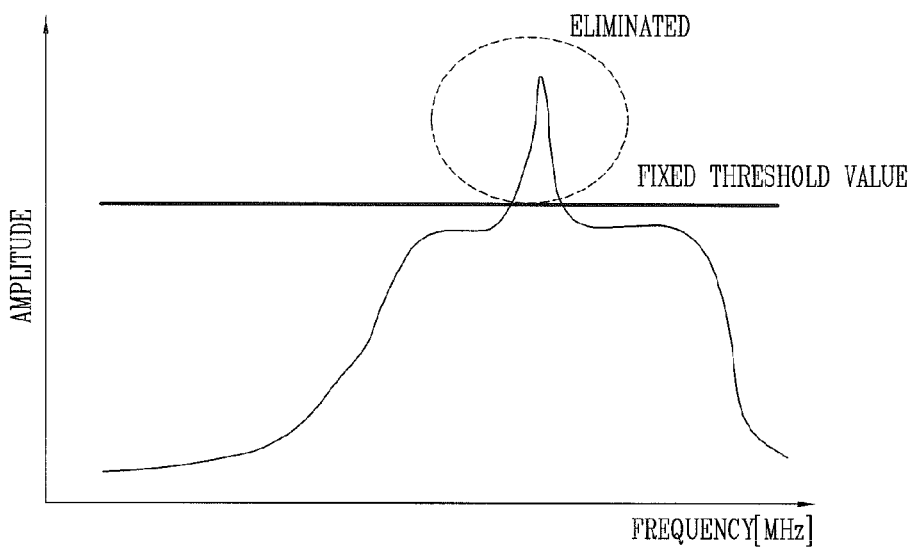
FIG. 1 is a graph showing a situation in which an interference signal (contaminated bin) is canceled by applying a fixed threshold value according to the related art in a single-tone situation.
Figure 2:
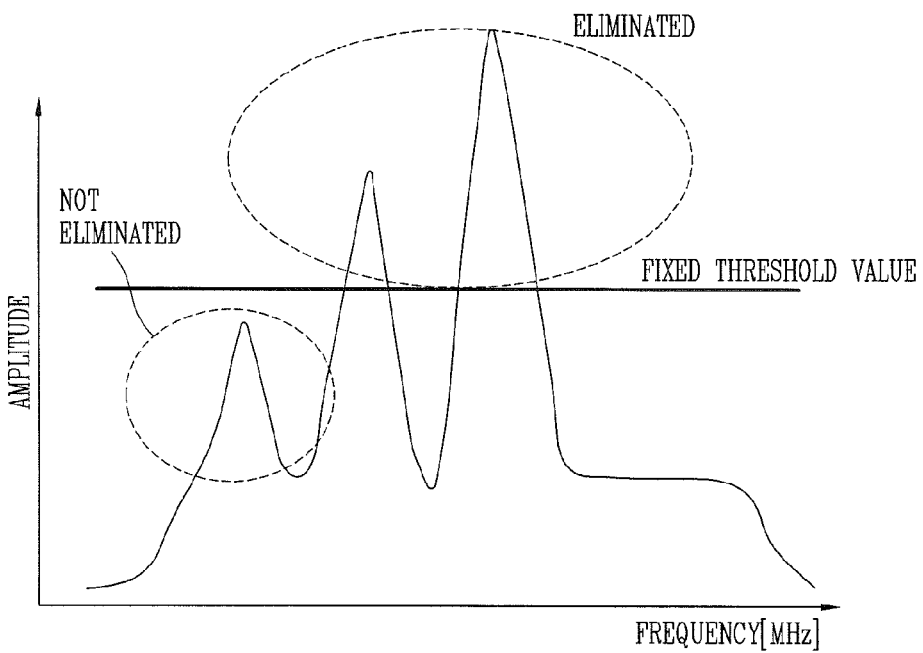
FIG. 2 is a graph showing a situation in which when a threshold value is set according to the related art in a multi-jamming environment including multi-tone, AM, FM, sweep, pulse, and the like, because an optimum threshold value is not set, a contaminated frequency component remains.

Exemplary embodiments of the present invention will now be described with reference to the accompanying drawings.

In the flow chart of each drawing, in adding a reference numeral to each procedure or adding a reference numeral to elements, the same reference numerals will be used throughout to designate the same or like components.

In the present invention, a method in which i) the presence or absence of a GPS narrowband jamming signal existing in an RF/IF in-band of a satellite navigation receiver, ii) an estimated threshold value level is set, and iii) a threshold value weight, a median value of a frequency sample amplitude existing in 2~8 MHz bandwidth, is estimated in order to eliminate a frequency component exceeding the set threshold value is used.

In addition, when there are multi-jamming or various types of jamming sources exist, namely, in a complicated electronic wave interference environment, a method of discretely adapting a fixed weight "K" required for setting a threshold value with respect to a jamming signal existing complicatedly in an in-band frequency band of a receiver by several stages (referred to as a "method for setting an adjustable K-media threshold value", hereinafter) is used.

Figure 3:
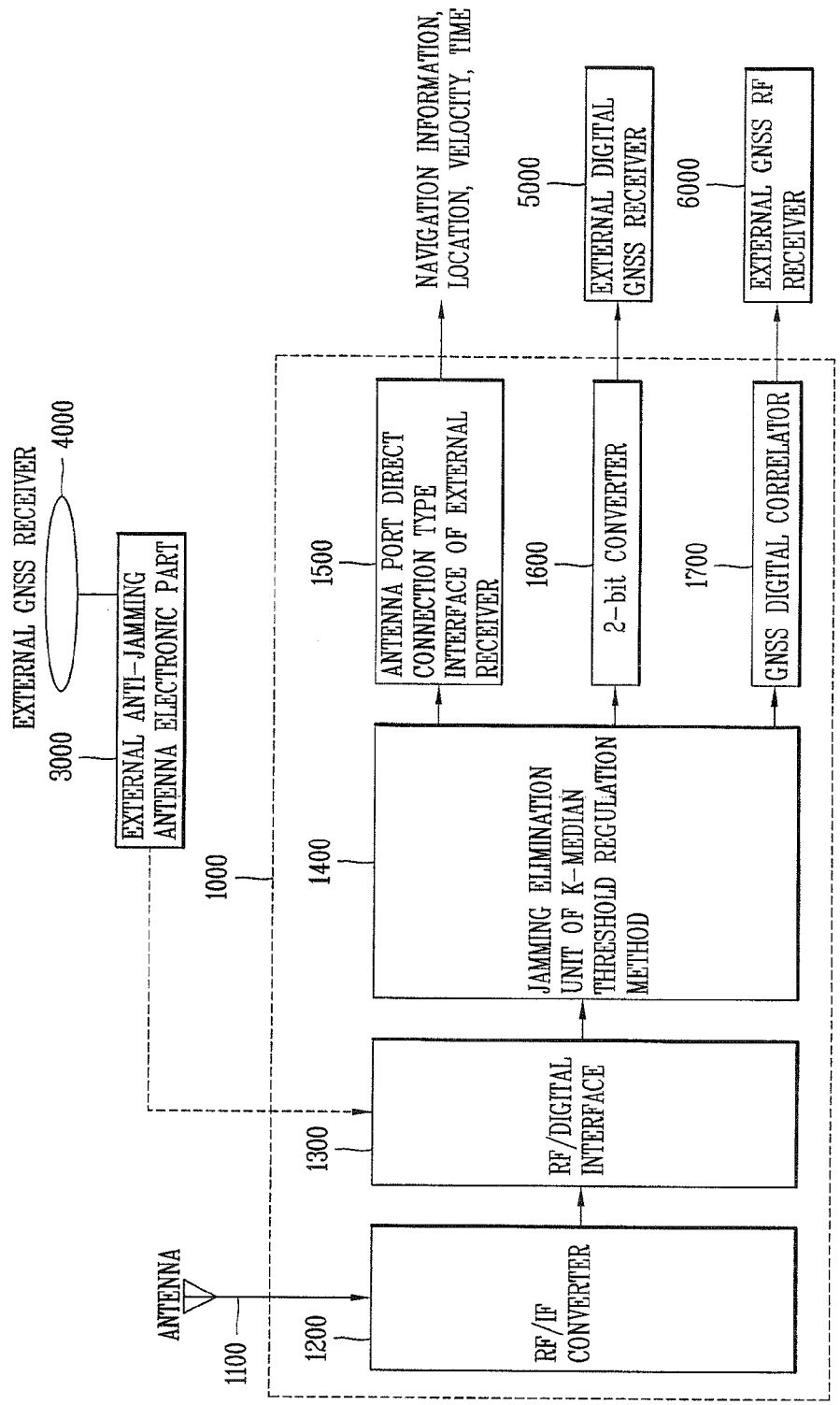
FIG. 3 illustrates the structure of an excisor 1000 for handling processing of a GPS/GLONASS/Galileo jamming or interference signal in a frequency domain, and an outer interface according to an exemplary embodiment of the present invention.

FIG. 3 illustrates the structure of an excisor 1000 for handling processing of a GPS/GLONASS/Galileo jamming or interference signal in a frequency domain, and an outer interface according to an exemplary embodiment of the present invention.

As shown FIG. 3, the excisor 1000 includes a GNSS (global navigation satellite system) antenna 1100, an RF/IF converter (or a high dynamic RF/IF translator) 1200 having high dynamic characteristics, an RF/digital interface circuit 1300, a jamming elimination unit of K-median threshold regulation method 1400, an antenna port direct connection type interface of external receiver 1500, a 2-bit converter 1600 for an external digital receiver, and a GNSS digital correlator 1700. The excisor 1000 may further include an externally mounted auxiliary GPS anti-jamming device 2000, an external anti-jamming device antenna electronic part 3000, an external digital GNSS receiver 4000, an external digital input GNSS receiver 5000, and an external GNSS RF receiver.

Figure 4:
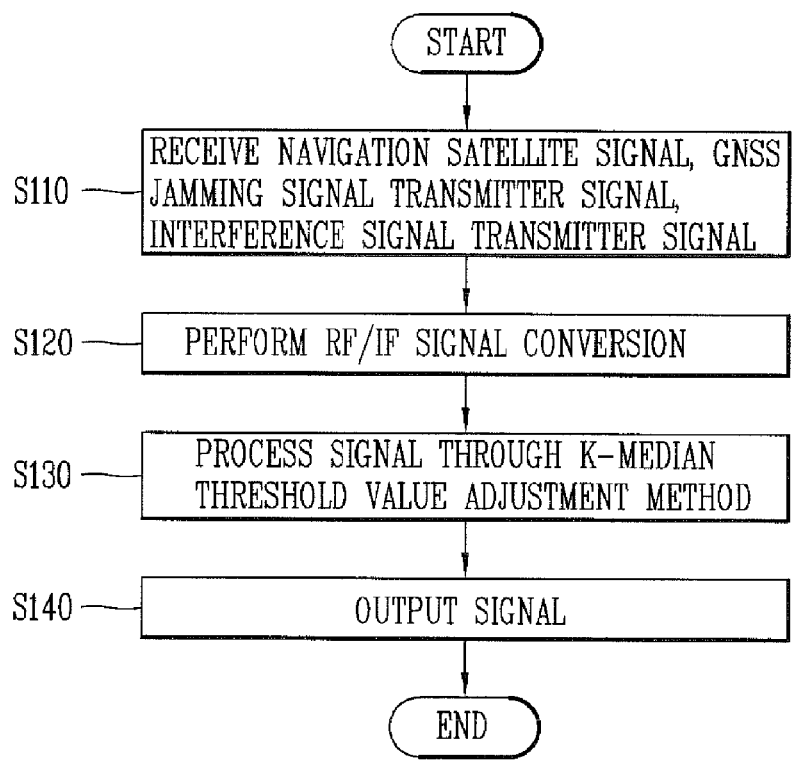
FIG. 4 is a flow chart illustrating the procedure of processing a signal in the excisor 1000 for handling processing of a GPS/GLONASS/Galileo jamming or interference signal in a frequency domain, and an outer interface according to an exemplary embodiment of the present invention.

FIG. 4 is a flow chart illustrating the procedure of processing a signal in the excisor 1000 for handling processing of a GPS/GLONASS/Galileo jamming or interference signal in a frequency domain, and an outer interface according to an exemplary embodiment of the present invention.

As shown in FIG. 4, the GPS/GLONASS/Galileo reception antenna 1100 receives a GPS/GLONASS/Galileo navigation satellite signal, a GNSS (global navigation satellite system) jamming signal transmitter signal, and an interference signal transmitter signal (step S110).

The signal is converted by the RF/IF converter 1200 having high dynamic characteristics (step S120) and undergoes a signal processing procedure in the RF/digital interface circuit 1300, and the jamming elimination unit 1400 of a K-median threshold value adjusting method (step S130).

Meanwhile, the external anti-jamming device antenna electronic part 3000 and the external GNSS receiver 400 may be selectively operated together in the RF/digital interface circuit 1300.

The signal which has undergone the foregoing procedure may be selectively output by using the antenna port direct connection type interface of external receiver 1500 or through the 2-bit converter 1600 for an external digital receiver and the GNSS digital correlator 170 so as to have an internal receiver function (step S140).

Figure 5:
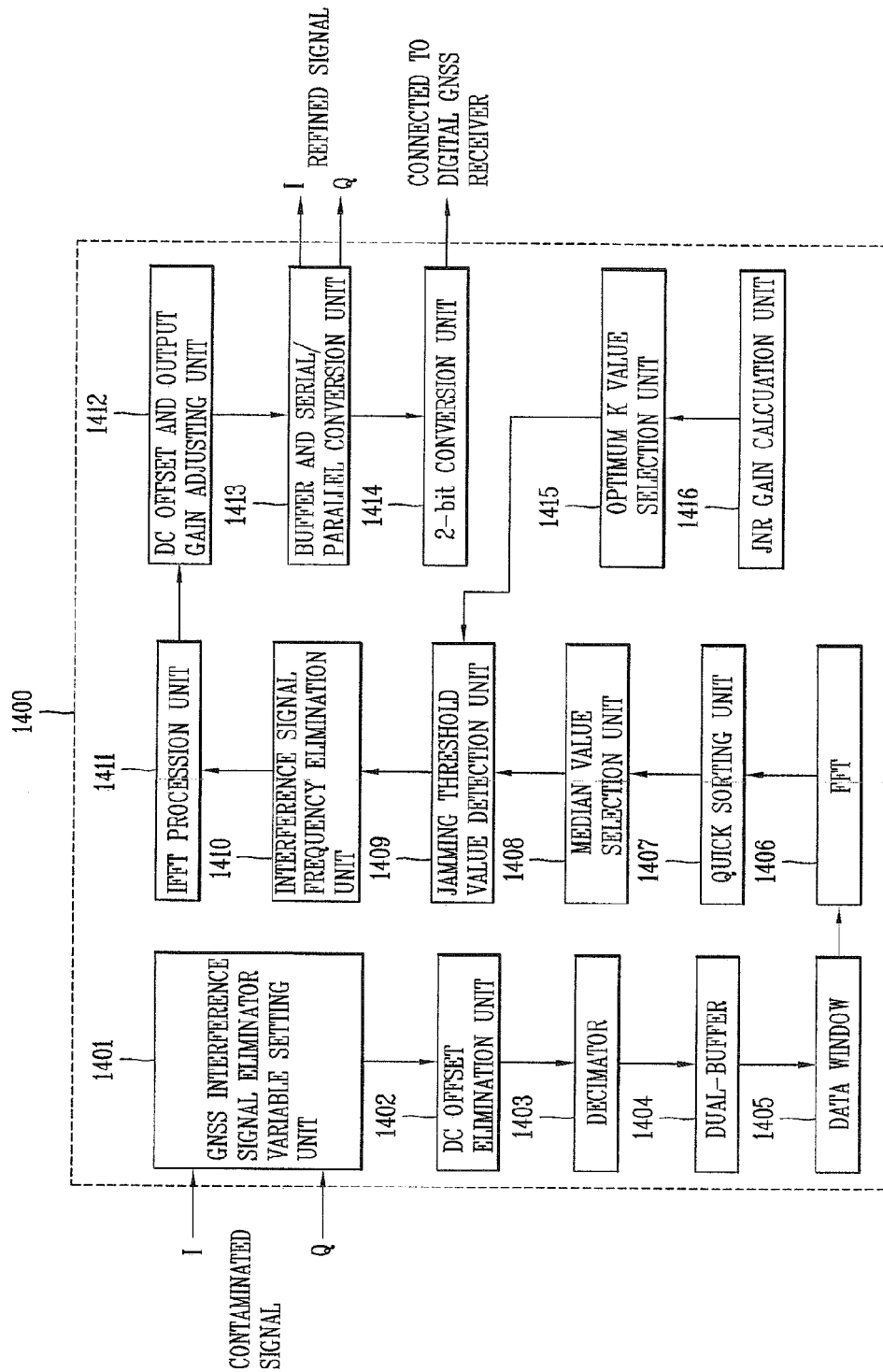
FIG. 5 illustrates an internal structure of a jamming elimination unit 1400 an a signal processing procedure according to an adjustable K-median threshold value adjusting method according to an exemplary embodiment of the present invention.

FIG. 5 illustrates an internal structure of a jamming elimination unit 1400 and a signal processing procedure according to an adjustable K-median threshold value adjusting method according to an exemplary embodiment of the present invention.

As shown in FIG. 5, a noise-mixed signal is received as a digital sample of a 14-bit in-phase and quadrature-phase and has a basic setting structure of the excisor in a GNSS interference signal eliminator variable setting unit 1401. An FFT (fast Fourier transform) size, a window type, an estimated threshold value (K value), elimination method, and the like, are set in the GNSS interference signal eliminator variable setting unit 1401.

The digital sample set in the GNSS interference signal eliminator variable setting unit 1401 undergoes an elimination procedure with respect to a DC offset of an input in an input sample DC offset elimination unit 1402.

The number of samples of the digital sample, which has undergone the elimination procedure, is reduced in a decimator 1403 for reducing the number of samples.

The digital sample having a smaller number of samples in the decimator 104 passes through a dual buffer 1404 for performing independent processing on an I channel and a Q channel, and also passes through a data window 1405 for reducing a side band spectrum extension phenomenon in performing FFT.

The digital sample processed in the data window 1405 passes through an FFT processing unit 1406 for converting a signal of a time domain into a frequency domain and aligned in a frequency component quick sorting unit 1407 for aligning a signal with respect to an amplitude size with respect to an individual spectrum generated after performing FFT.

When there is a component exceeding an estimated threshold value among the aligned components, it passes through a median value selection unit 1408 for selecting a median component for eliminating the component that exceeds the estimated threshold value.

The estimated threshold value (K weight) is applied to the median value selected when the processed sample passes through the jamming threshold value detection unit 1409, to thus determine a jamming signal and a threshold value for eliminating noise of a receiver, and the interference signal-contained frequency bin elimination unit 1410 eliminates an individual bin, a contaminated frequency component based on the threshold value.

The sample, from which the contaminated frequency component has been eliminated, is converted in an IFFT (Inverse fast Fourier transform) unit 1411 for converting a frequency component into a time domain.

A DC offset and a gain of the sample converted into the time domain are adjusted in the DC offset and output gain adjusting unit 141, and the signal processing-completed sample passes through the buffer and parallel-serial conversion unit 1413 for converting it into the same standard as that of the original input signal.

In order to send a signal of a digital receiver input standard, the signal passes through the 2-bit conversion unit 141 that handles a 2-bit conversion function corresponding to a sign and a magnitude, the JNR gain calculation unit 1416 for independently calculating a JNR after FFT, and the optimum K value selection unit 1415 that handles a K value selection function according to the JNR gain reference. With respect to the inputted digital sample, the JNR gain calculation unit 1416 calculates the size of the jamming signal and the receiver noise level by using the frequency component after the FFT output. In order to enhance the SNR and JSR performance of the receiver, the use of the variable structure according to jamming conditions is more advantageous for enhancing the anti-jamming performance, compared with the application of the fixed K.

The GNSS interference signal exciser 1000 of the frequency domain may have a function of directly calculating navigation information such as a location, velocity, time, and the like, by selectively using the general receiver, the digital receiver, and the internal correlator.

Figure 6:
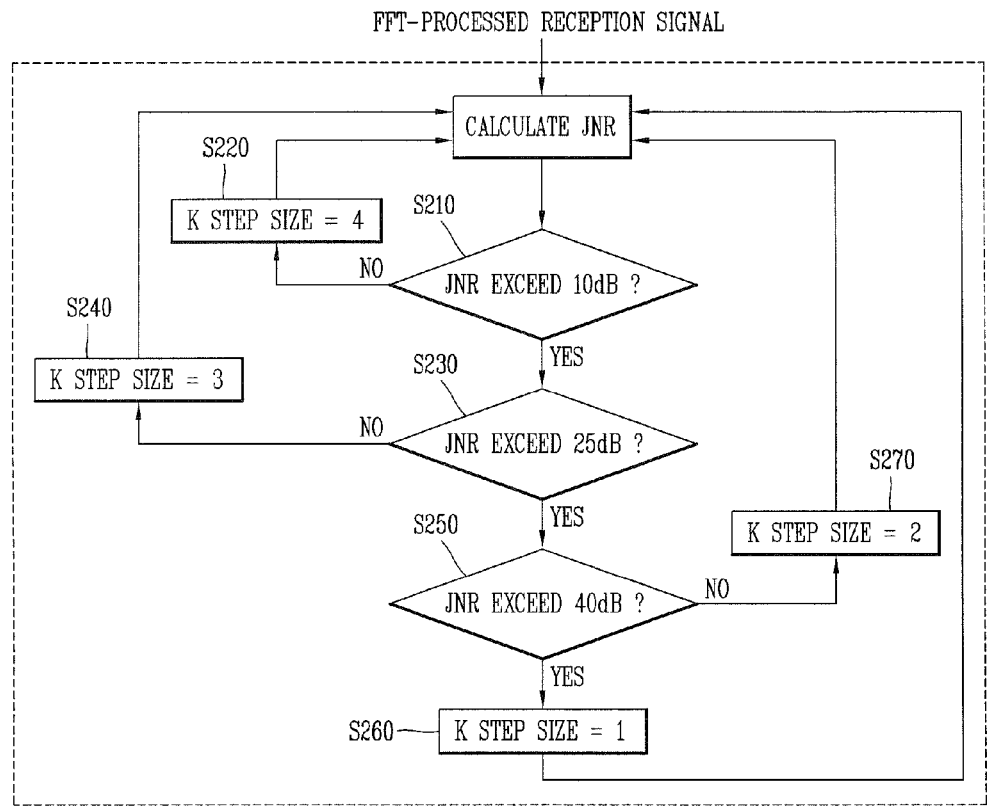
FIG. 6 illustrates the function of a selective optimum K value selection unit 1415 according to an exemplary embodiment of the present invention.

FIG. 6 illustrates the function of a selective optimum K value selection unit 1415 according to an exemplary embodiment of the present invention.

This method is able to effectively eliminate a contaminated signal in case of multi-jamming.

As shown in FIG. 6, in calculating a JNR, first, it is determined whether or not a JNR gain exceeds 10 dB which makes a jamming influence on the satellite navigation receiver (step S210).

When the JNR is 10 dB or lower, K-step size is set to be 4 (step S220).

When the JNR exceeds 10 dB, it is determined whether or not the JNR exceeds 25 dB in step S230. When the JNR is 25 dB or lower, the K-step size is set to be 3 (step S240), and when the JNR exceeds 25 dB, it is determined whether or not the JNR exceeds 40 dB in step S250.

When the JNR is 40 dB or lower, the K-step size is set to be 2 (step S270), and when the JNR exceeds 40 dB, the K-step size is set to be 1 (step S260).

Namely, with a high level of jamming signal, if the fixed K value is applied to set the jamming signal threshold value, media values of the in-band frequency components becomes high overall, leaving an interference component without being eliminated. In comparison, when the JNR becomes high through the foregoing procedure according to an exemplary embodiment of the present invention, the threshold value level using the media value of the frequency sample existing in the in-band frequency band is intentionally lowered by applying the K value adjusting method, whereby the interference component remaining rather than having been eliminated can be removed, and the JR can be improved and the gain with respect to the SNR of the receiver can be obtained.

Figure 7:
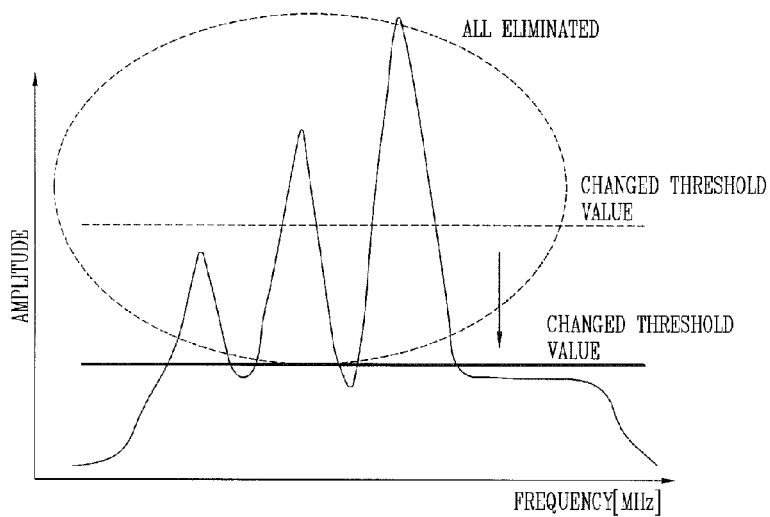

FIG. 7 is a graph showing an effect of canceling interference when an adjustable K threshold value method according to an exemplary embedment of the present invention is applied in a multi-jamming environment including multi-tone, AM, FM, sweep, pulse, and the like.

As shown In FIG. 7, in case of applying the adjustable K-median threshold value adjusting method, when the threshold value level is lowered to eliminate the interference component remaining according to the fixed method, the contaminated signal can be entirely removed compared with the case in which the fixed threshold value is used.

Figure 8:
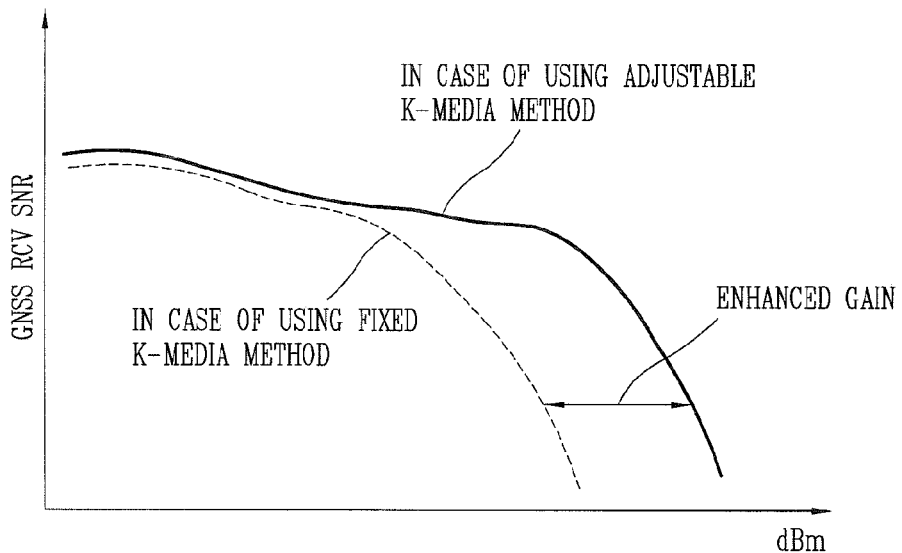
FIG. 8 is a graph showing enhanced JSR and SNR gains in case in which the adjustable K-median threshold value adjustment method according to an exemplary embodiment of the present invention is applied and in case in which the existing fixed threshold value is applied.

FIG. 8 is a graph showing enhanced JSR and SNR gains in case in which the adjustable K-median threshold value adjustment method according to an exemplary embodiment of the present invention is applied and in case in which the existing fixed threshold value is applied.

As shown in FIG. 8, compared with the case in which the fixed threshold value is used, when the adjustable K-median threshold value adjusting method is applied, the JSR and the SNR gain becomes larger with respect to the increase in the jamming output.

Figure 9:
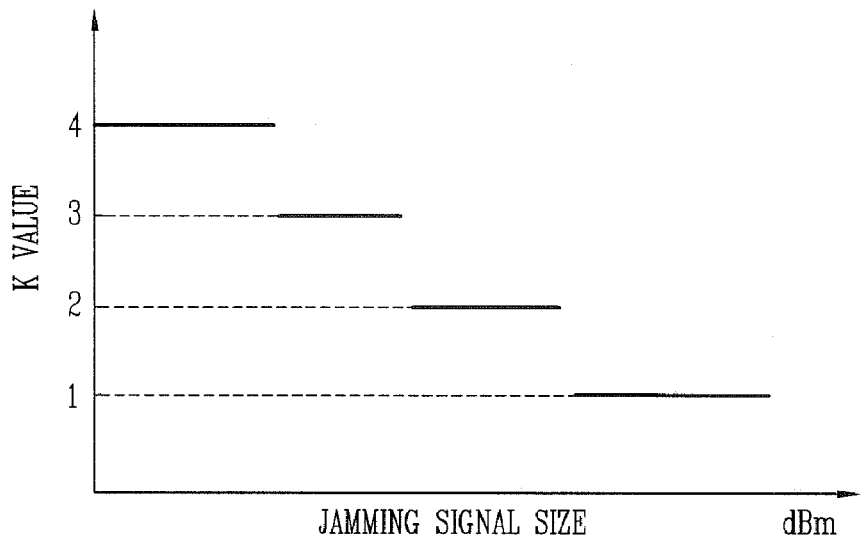
FIG. 9 is a graph showing step sizes of K varying over amplitude of a input jamming signal according to an exemplary embodiment of the present invention.

FIG. 9 is a graph showing step sizes of K varying over amplitude of a input jamming signal according to an exemplary embodiment of the present invention.

As shown in FIG. 9, it is noted that the K value may range from 5 to 1 according to the size of the jamming signal, and as the jamming signal increases, the K value is set to be lower.

Figure 10:
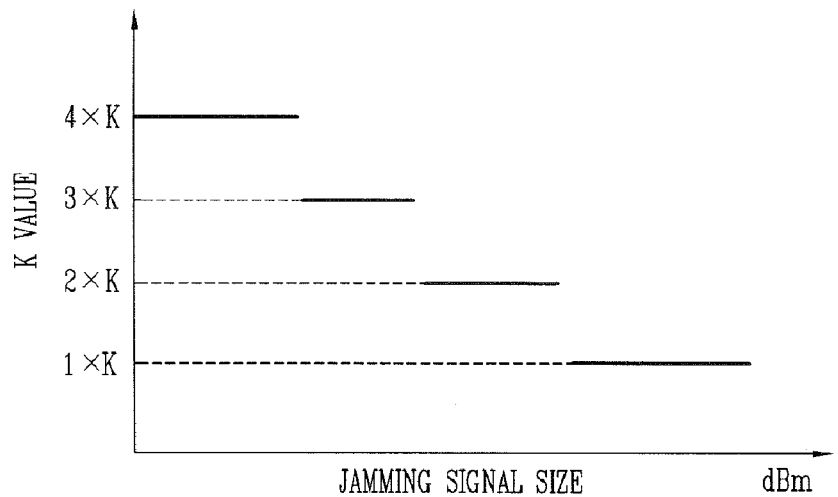
FIG. 10 is a graph showing a level variation of the adjustable K threshold value method changing as the K value is varied according to an exemplary embodiment of the present invention.

FIG. 10 is a graph showing a level variation of the adjustable K threshold value method changing as the K value is varied according to an exemplary embodiment of the present invention.

As shown in FIG. 10, the threshold value is rapidly increased at an end portion of each K step interval, and in this case, the weight with respect to the K value is lowered to maintain the threshold value such that it does not go beyond the noise level of the receiver.

Figure 11:
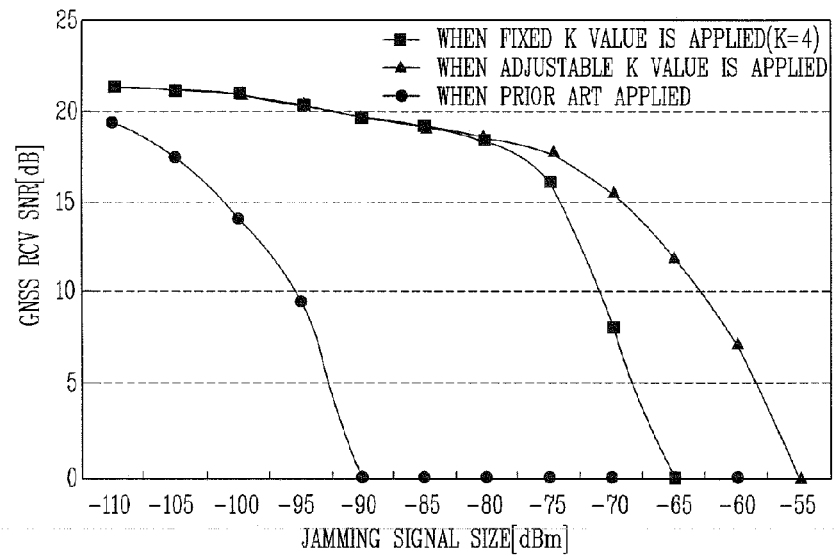
FIG. 11 is a graph showing enhancement degrees of anti-jamming performance in case in which the adjustable K median scheme is applied and in case in which the adjustable K median scheme is not applied according to the related art and according to an exemplary embodiment of the present invention.

FIG. 11 is a graph showing enhancement degrees of anti-jamming performance in case in which the adjustable K median scheme is applied and in case in which the adjustable K median scheme is not applied according to the related art and according to an exemplary embodiment of the present invention.

As shown in FIG. 11, there is a slight difference in the enhancement of performance at each interval, but it is noted that the method proposed by the present invention maintains the same SNR even at the interval in which the jamming power is higher by 10 dB or more at the level of SNR 5 dB of the satellite navigation receiver.

As described above, the K value according to the exemplary embodiment of the present invention is divided into four classes ranging from 1 to 4 according to the size of the jamming signal; however, in determining the class, an upper limit value may be raised or a lower limit value may be lowered, and the difference of the respective K values may be set to be a value smaller than 1 or larger than 1.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The method and apparatus for adjusting the threshold value weight in the frequency domain for enhancing anti-jamming performance and eliminating jamming in the GPS system have the industrial applicability.

The invention claimed is:

1. An adjustable GPS jamming elimination method implemented by a jamming excisor, the method comprising:
converting a signal received from a reception antenna to a signal in a frequency domain;
determining a jamming signal in an in-band spectrum of the converted signal in the frequency domain;
setting initially an estimated threshold value for anti jamming filtering;
selecting a median value in a frequency domain of the jamming signal;
determining a conclusive threshold value by applying the estimated threshold value to an adjustable threshold value based on an amplitude of the median value; and
determining whether to eliminate an individual bin of the jamming signal as an interference frequency component based on the conclusive threshold value.

2. The method of claim 1, wherein the adjustable threshold value is obtained by using a JNR (jamming to noise ratio) gain that corresponds to a ratio between the amplitude of the median value and nose of a receiver.

3. The method of claim 2, wherein the adjustable threshold value is divided into four stages based on the amplitude of the median value.

4. The method of claim 2, further comprising:
when the JNR gain is 10 dB or smaller, setting the adjustable threshold value as 4;
when the JNR gain exceeds 10 dB, determining whether or not the JNR gain exceeds 25 dB, and when the JNR gain is 25 dB or lower, setting the adjustable threshold value as 3, and when the JNR gain exceeds 25 dB, determining whether or not the JNR gain exceeds 40 dB; and
when the JNR gain is 40 dB or lower, setting the adjustable threshold value as 2, and when the JNR gain exceeds 40 dB, setting the adjustable value as 1.

5. The method of claim 1, wherein the median value is a median value of an in-band spectrum of a received signal.

6. The method of claim 5, wherein the received signal is a signal received from one or more of a GPS system, a GLONASS system, and a Galileo system.

* * * * *